United States Patent [19]
Kuramoto et al.

[11] 3,728,946
[45] Apr. 24, 1973

[54] SWITCHING APPARATUS FOR EXPOSURE CONTROL DEVICES

[75] Inventors: Yoshio Kuramoto, Kayoshi Tsujimoto, Kotaro Yata, Masayoshi Sahara, Osaka all of Japan

[73] Assignee: Minolta Camera Kabushiki Kaisha, Osaka-fu, Japan

[22] Filed: July 6, 1971

[21] Appl. No.: 159,886

[30] Foreign Application Priority Data

July 7, 1970 Japan..................................45/58754

[52] U.S. Cl...............................95/10 CT, 95/53 EB
[51] Int. Cl...........................G03b 7/08, G03b 17/18
[58] Field of Search..................95/10 C, 10 CT, 53 E, 95/53 EA, 53 EB

[56] References Cited

UNITED STATES PATENTS

| | | | |
|---|---|---|---|
| 3,527,149 | 11/1970 | Starp et al. | 95/10 CT |
| 3,504,601 | 4/1970 | Schubert | 95/10 CT |
| 3,460,451 | 8/1969 | Starp et al. | 95/10 CT |
| 3,324,779 | 6/1967 | Nobusawa et al. | 95/53 EB X |
| 3,063,354 | 11/1962 | Matulik et al. | 95/10 CT |

Primary Examiner—Joseph F. Peters, Jr.
Attorney—Watson, Cole, Grindle & Watson

[57] ABSTRACT

Switching mechanism in an exposure control device for a photoconductive camera reduces unnecessary battery consumption by disconnecting the power source from a light measuring circuit and a mechanism for actuating shutter closing during those times when either the output of the light measuring circuit and/or the actuation of the shutter are not required. Manually operative individual switches respectively interconnect the light measuring circuit and the shutter actuation mechanism with the power source. A button switch movable between first and second positions engages with a locking member to prevent actuation of the shutter release button to prevent interconnection of the shutter actuating mechanism with the power source when an exposure time setting member is set to an automatic exposure position and the button switch is in the first position for opening the switch interconnecting the light measuring circuit with the battery source. Rotation of the exposure time setting member to any one of a number of positions rotates the locking member enabling the release button to be depressed and the interconnection of the shutter actuating mechanism with the battery source.

8 Claims, 5 Drawing Figures

INVENTORS
YOSHIO KURAMOTO
KAYOSHI TSUJIMOTO
KOTARO YATA
MASAYOSHI SAHARA

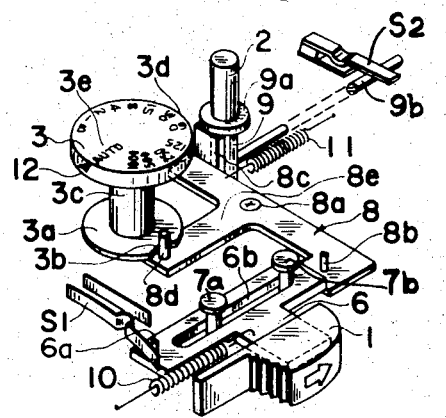
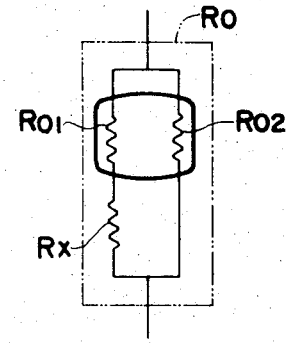
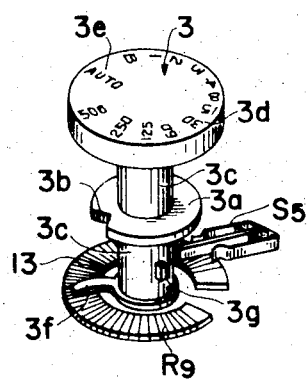

SWITCHING APPARATUS FOR EXPOSURE CONTROL DEVICES

BACKGROUND OF THE INVENTION

The present invention relates to a camera provided with an electric shutter for measuring light through a photographic lens to automatically control the exposure time in a TTL type light measuring camera.

In the TTL type light measuring camera, it is impossible to measure light during the shutter operation, therefore, it is necessary to measure and store the intensity of light from an object just prior to photographing it. The electric shutter is controlled by the stored voltage representative of the light intensity.

In the TTL type camera provided with such an electric shutter, in order to store the measured light value the consumption of current is high. The current consumption is especially high in order to obtain high precision light measurement to a constant voltage is provided to a light measuring circuit because of a constant current generating circuit connected between the power source and the light measuring circuit.

And yet, in TTL type light measuring cameras having an electric shutter circuit composed of a light measuring circuit and an exposure time control circuit is operated by a single electric power source battery, there is a need for minimizing the power consumption in changing over between automatic exposure time control and manual exposure time control. There is also a need for means for error-free respective operation of the automatic exposure time control and the manual exposure time control and a means for easily changing over the two controls.

OBJECT OF THE INVENTION

One object of the present invention is to provide apparatus in a photographic camera of the type specified herein for which overcomes the prior art drawbacks mentioned above and which effects switch control of the light measuring circuit and the exposure time control circuit so as to prevent the consumption of the power source battery to the utmost.

Another object of the present invention is to provide apparatus in a TTL photometric camera for effecting exposure either automatically or manually whereby the change over operation between automatic exposure time control and the manual exposure time control is reliable and error-free.

A feature of the present invention is that in the case of automatic exposure time control, in order to decrease the consumption of the power source battery and correctly operate the exposure time control circuit after the light measuring circuit is operated, a switch button for closing the light measuring switch and a release button for closing the main switch for the exposure time control circuit are operated in conjunction with each other.

A further feature of the present invention is to provide a apparatus for effecting the release of the shutter locking mechanism in cooperation with the closing of the light measuring switch.

Another feature of the present invention is to provide apparatus for maintaining the light measuring switch open when the camera is set up for manual exposure time control, the shutter locking mechanism is released and the main switch for the exposure time control circuit can be closed in conjunction with the release operation.

Other objects and features of the present invention will be apparent from the following description of an embodiment in accordance with the present invention.

SUMMARY OF THE INVENTION

In order to attain the objects mentioned above the present invention relates to a TTL photometric camera so formed that by closing a light measuring switch for a photometric circuit, to which a constant voltage of a photoconductive element is impressed in conjunction with the operation of a switch button, the light measuring circuit is operated and the operation of the switch button actuates a release button. The closing of a main switch effects automatic exposure time control in an exposure time control circuit in conjunction with the operation of the release button.

A release lock member automatically controls the locking and release of a release button on response to the movement of the shutter speed dial between automatic exposure time control and manual exposure time control. The release button closes the main switch in the exposure time circuit, which switch is between a delay circuit and a shutter closing control electromagnet. A switch button controls the release lock member to actuate a switch between the power source and the light measuring circuit.

In accordance with the present invention, the useless waste of power source is avoided, and in the case of automatic exposure time control as long as the switch button for closing the light measuring switch connected between the light measuring circuit and the power source is not operated the shutter button can not be pressed. Thereby the exposure time control circuit is not operated prior to the operation of the light measuring circuit and a malfunctioning of the camera can be prevented. Also, upon setting up the exposure time manually, the lock mechanism is released through the adjustment of the shutter speed dial, and regardless of the opening/closing of the light measuring switch for the light measuring circuit, only by the operation of the release button is the exposure time control circuit operated in accordance with the exposure time set up to effect the opening/closing of the shutter.

BRIEF DESCRIPTION OF THE DRAWINGS

FIG. 3 is a partial perspective view showing the relative formation of the camera mechanism and the switch for the electric circuit in accordance with the present invention.

FIG. 4 is a block diagram showing an exemplary compound photoconductive element used in the photometric circuit in accordance with the present invention.

FIG. 5 is a partial perspective view showing the relation between the change-over means, the change-over switch, and the variable resistance for manual exposure control.

DESCRIPTION OF THE PREFERRED EMBODIMENT

Figure 1:
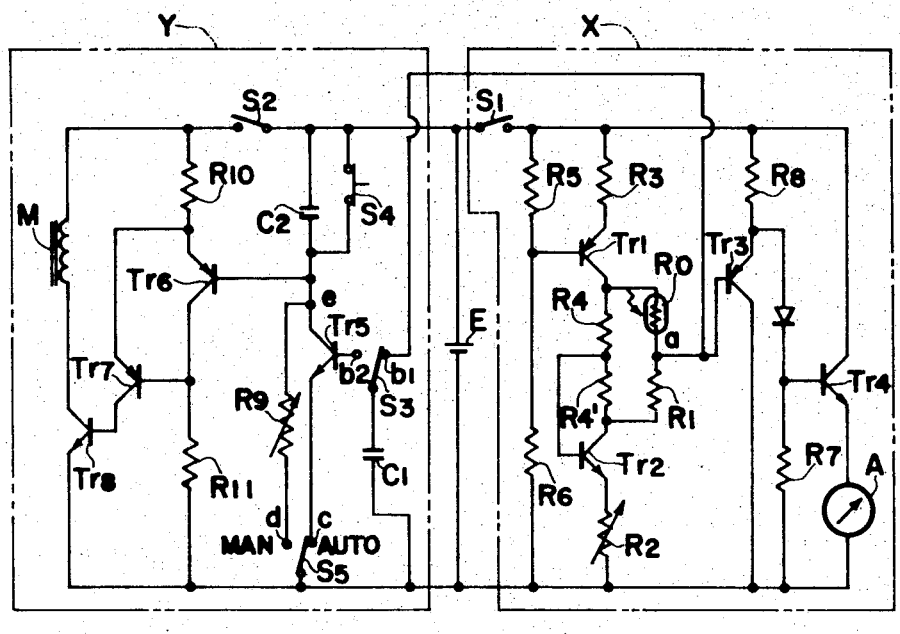
FIG. 1 is a wiring diagram of one embodiment of the light measuring circuit and the exposure time control circuit having a storage circuit in a TTL type camera in accordance with the present invention.

With reference to the accompanying drawings, FIG. 1 shows the light measuring circuit used in the present invention and the exposure time control circuit provided with a storage circuit. X denotes the light measuring circuit and Y denotes the exposure time control circuit. Light measuring circuit X and exposure time control circuit Y are respectively formed independently relative to electric power source E.

In light measuring circuit X, electric power source E is connected to voltage dividing resistances $R_5$, $R_6$ via switch $S_1$ and the node between voltage dividing resistances $R_5$, $R_6$ is connected to the base of first step compensation transistor $Tr_1$. A series connected network composed of compound photoconductive element $R_o$ and resistance $R_1$ is connected to the collector of transistor $Tr_1$, and resistances $R_4$, $R'_4$ are connected in parallel with the series connected network. Resistance $R'_4$ is inserted between the base and the collector of transistor $Tr_2$, and variable resistance $R_2$ for inserting the film sensitivity and the diaphragm settings is connected to the emitter of transistor $Tr_2$.

Compound photoconductive element $R_o$ is formed by connecting photoconductive element $R_{o1}$ in series with fixed resistance $R_x$ and photoconductive element $R_{o2}$ in parallel with photoconductive element $R_{o1}$ as shown in FIG. 4. Node $a$ between compound photoconductive element $R_o$ and resistance $R_1$ is connected to the base of amplifier transistor $Tr_3$ and also terminal $b_1$ change-over switch $S_3$ in the exposure time control circuit. And, the output of amplifier transistor $Tr_3$ is connected to ammeter A via amplifier transistor $Tr_4$.

The resistance values of compound photoconductive element $R_o$ and resistance $R_1$ are large enough as compared with resistances $R_4$, $R'_4$, so that almost all of the collector current of first step compensation transistor $Tr_1$ flows through resistances $R_4$, $R'_4$. The collector current is a constant current, therefore, a constant voltage is impressed across the series connected network composed of compound photoconductive element $R_o$ and resistance $R_1$. The current characteristic of compound photoconductive element $R_o$ is proportional to the logarithmic compression of the illuminance on the light receiving surface thereof, so that a voltage given having a corresponding logarithmic compression is generated across resistance $R_1$. Therefore, the electric potential of node $a$ undergoes a change in accordance with the illumination on the light receiving surface of compound photoconductive element $R_o$, and the diaphragm and the film sensitivity settings effected by variable resistance $R_2$. The electric potential of node $a$ is indicated by ammeter A as the value corresponding to the shutter speed.

In such a circuit, a current of approximately 200 $\mu$A flows as the collector current of transistor $Tr_3$, and also through ammeter A a current of approximately 200 $\mu$A flows in the worst case, so that provided switch $S_1$ is closed the consumption of the power battery is considerable. In the present invention, therefore, when switch button 1 (shown in FIG. 3) is operated photometric switch $S_1$ is then only capable of being closed to operate light measuring circuit X.

Further, in exposure time control circuit Y, node $a$ is connected to contact $b_1$ of change-over switch $S_3$ as described previously, and when change-over switch $S_3$ is switched to contact $b_1$ storage capacitor $C_1$ is charged to the voltage at node $a$. The other contact $b_2$ of change-over switch $S_3$ is connected to the base of transistor $Tr_5$, and delay capacitor $C_2$ and normally closed timing switch $S_4$ are connected to the collector of transistor $Tr_5$. Node $e$ is connected to the base of transistor $Tr_6$ in the switching circuit and also to the base of transistor $Tr_8$ through transistor $Tr_7$. Electromagnet M for controlling the shutter closing operation is connected in the collector circuit of transistor $Tr_8$. Between that switching circuit and electric power source E main switch $S_2$, for exposure time control circuit Y, is provided and main switch $S_2$ is closed in conjunction with the operation of release button 2 (shown in FIG. 3). Manual exposure setting variable resistance $R_9$ is connected to terminal d of automatic manual change over switch $S_5$ in the "MAN" position.

Now, upon positioning automatic manual change-over switch $S_5$ to "MAN" side terminal $d$, exposure control circuit Y is disconnected from light measuring circuit X and transistor $Tr_5$, and variable resistance $R_9$ is connected to delay capacitor $C_2$ and electromagnet M is operated after a delay time determined by delay capacitor $C_2$ and variable resistance $R_9$. In this case, by previously setting for the diaphragm value through variable resistance $R_2$ in light measuring circuit X and closing switch $S_1$ it is possible to read the exposure time on ammeter A and also possible to set up that exposure time by variable resistance $R_9$.

And, with the positioning of automatic manual change-over switch $S_5$ side on "AUTO" side terminal c, an electric potential is generated at node $a$ and that electric potential, determined by the film sensitivity setting, diaphragm setting, and the resistance of compound photoconductive element $R_o$, is indicated by ammeter A as the shutter speed. Simultaneously the electric potential at node $a$ is stored by capacitor $C_1$ in exposure time control circuit Y by closing switch $S_1$ in light measuring circuit X.

Then, main switch $S_2$ for exposure time control circuit Y is closed in conjunction with the release operation and at the same time change-over switch $S_3$ is switched from contact $b_1$ to contact $b_2$. Simultaneously with the opening operation the shutter, timing switch $S_4$ is opened and delay capacitor $C_2$ is started to be charged and when it charges to a certain voltage the switching circuit is reversed and thereby electromagnet M is operated to effect the shutter closing operation. In this case, transistor $Tr_5$ logarithmically elongates the voltage of capacitor $C_1$ so as to control the shutter speed in accordance with the illumination on the light receiving surface of the photoconductive element.

Figure 2:
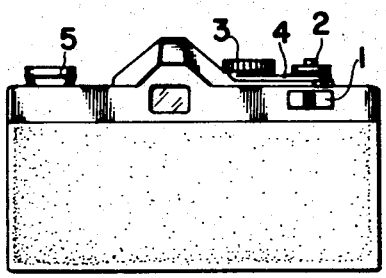
FIG. 2 is a rear view of the TTL camera housing in accordance with the present invention.

The relationship between the electric circuit and the camera mechanism is shown in FIG. 2 and FIG. 3. In FIG. 2 the back of the camera is shown, wherein reference numeral 1 denotes a switch button, 2 a release button, 3 a shutter speed dial, 4 a winding lever, and 5 a rewinding knob. In FIG. 3, switch button 1 is attached to a protrusion of switch working plate 6, which is formed so as to move along guide slot 6b formed thereon and guided by guide pins 7a, 7b. Spring 10 biases working plate 6 toward guide pin 7a.

Pin 6a is mounted on switch working plate 6 and engages with the movable contact piece of switch $S_1$ having a closing tendency whereby switch $S_1$ is open and by the bias of spring 10. Switch working plate 6 is moved to the right said photometric switch $S_1$ is closed only when switch working plate 6 is moved toward guide pin 7b.

Release lock plate 8 is mounted within the space between release button 2 and shutter speed dial 3 and is in engagement with switch working plate 6. Release lock plate 8 is supported rotatably on the camera main body by pin 8a and given a clockwise turning tendency in FIG. 3 by spring 11. And release lock plate 8 has on one end thereof pin 8b for engaging with switch working plate 6 and on the other end thereof extension 8c in the proximity of release rod 9 which is integral to release button 2. Therefore, in the clockwise turning position of release lock plate 8 extension 8c of release lock plate 8 is located under collar 9a of release rod 9 to prevent the depression of release button 2. With the rightward movement of switch working plate 6 effected by the operation of switch button 1, release lock plate 8 is turned counterclockwise by pin 8b to simultaneously withdraw extension 8C of release lock plate 8 from the underside collar 9a of release rod 9. Release rod 9 is provided with protrusion 9b for closing main switch $S_2$ in exposure time control circuit Y and an operation member (not shown in the drawing) for switching change-over switch $S_3$. And, release lock plate 8 is provided with projection 8c and on the tip of projection 8c pin 8d is fixed. Shutter speed dial 3 has on its upper surface scales 3d, 3e which respectively cooperate with index 12 formed on the camera main body. "AUTO" scale 3e effects automatic exposure time control and scale 3d establishes the exposure time which is manually set up. Shutter dial 3 is fixed to cam plate 3a by means of shaft 3c and cam plate 3a has on its periphery notch 3b. When "AUTO" scale 3e is aligned with index 12 pin 8d on release lock plate 8 fits in notch 3d to permit release lock plate 8 to turn clockwise. When scale 3d is aligned with index 12 cam plate 3a turns pin 8d counterclockwise against spring 11 and withdraws extension 8c from collar 9a of release rod 9. And as shown in FIG. 5, lug 3g for operating automatic-manual change over switch $S_5$ and slide brush 3f of slide resistance 13 for changing the resistance value of variable resistance $R_9$ in interlocking relationship with the operation of setting manual exposure time setting scale 3d upon index 12 are provided. And, in the mechanism shown in FIG. 3, with switch button 1 pushed toward pin 7b to close switch $S_1$ it is also possible to add a mechanism to hold switch button 1 in that position and at the same time simultaneously operate the shutter, and return switch button 1 to its initial position by depressing switch button 1.

What is claimed is:

1. An exposure control device for a photographic camera of the type having a photoconductive member for receiving scene light through an objective lens of the camera, comprising:
   an electric power source;
   a light measuring circuit for generating an output signal as a function of the light intensity incident on said photoconductive member;
   a first switch connected between said electric power source and said light measuring circuit;
   means for storing said output signal;
   a second switch selectively connecting said means for storing to said light measuring circuit for storing said output signal;
   means for actuating shutter closing;
   an electric timing means responsive to said stored output signal for controlling said means for actuating and timing the shutter closing in accordance with said light intensity on said photoconductive member;
   A third switch connected between said electric power source and said means for actuating;
   first means for closing said first switch to connect said light measuring circuit to said electric power source;
   and second means for closing said third switch to connect said means for actuating to said electric power source, said first and second means being manually independently operable of each other.

2. An exposure control device as in claim 1, wherein said light measuring circuit includes a constant current generating circuit connectable to the electric power source through said first switch, and said photoconductive member comprises a first photoconductive element connected in series with a fixed resistance and a second photoconductive element connected in parallel with said first photoconductive element and said fixed resistance, and said first and second photoconductive elements are connected to said constant current generating circuit for generating output voltage proportional to the logarithmic value of the intensity of light received on both said first and second photoconductive elements.

3. An exposure control device as set forth in claim 1, wherein said first means is movable between a first position for opening said first switch and a second position for closing said first switch, and said first means is biased to said first position;
   said second means is movable between a first position for opening said third switch and a second position for initiating exposure by closing said third switch, and said second means is biased to said first position; and said exposure control device further comprising:
   an interlocking member engageable with said first means and said second means, and said interlocking member is biased to maintain said engagement for preventing the movement of said second means from said first position thereof to said second position thereof when said first means is in said first position thereof.

4. An exposure control device as in claim 1, wherein said electric timing circuit includes a switching circuit interconnecting said means for actuating and said third switch.

5. An exposure control device as in claim 1, further comprising, an interlocking member for preventing said second means from closing said third switch when said first switch is opened to disconnect said light measuring circuit from said electric power source.

6. An exposure control device as in claim 5, further comprising, an exposure time setting member movable to an automatic exposure position and a selected one of a number of manual exposure setting positions and interconnected with said interlocking member for preventing said second means from closing said third switch when said exposure time setting member is set to said automatic exposure position.

7. An exposure control device as in claim 6, wherein said electric timing means includes biasing means for adjusting the exposure time, and the movement of said exposure time setting member controls said biasing means.

8. An exposure control device as in claim 7, wherein said exposure time setting member includes a cam member having a notched portion, said biasing means comprises a contact slidable on a variable resistance, and a member for actuating a fourth switch for selectively connecting said electric timing means to said means for storing and said variable resistance, whereby when said exposure time setting member is positioned at said manual exposure position, said fourth switch connects said electric timing means to said variable resistance and said cam member retains said interlocking member to prevent said second means from closing said third switch, and whereby when said exposure time setting member is positioned at said automatic exposure position, said fourth switch connects said electric timing means to said means for storing and said notched portion releases said interlocking member from engagement with said second means.

* * * * *